(12) United States Patent
Striano

(10) Patent No.: US 7,947,388 B2
(45) Date of Patent: May 24, 2011

(54) BATTERY PACK FOR AN INDUSTRIAL INSTRUMENT IN A PROCESS CONTROL SYSTEM AND METHOD

(75) Inventor: Mark V. Striano, Horsham, PA (US)

(73) Assignee: Honeywell International Inc., Morristown, NJ (US)

(\*) Notice: Subject to any disclaimer, the term of this patent is extended or adjusted under 35 U.S.C. 154(b) by 331 days.

(21) Appl. No.: 11/701,798

(22) Filed: Feb. 2, 2007

(65) Prior Publication Data

US 2008/0186656 A1 Aug. 7, 2008

(51) Int. Cl.
*H01M 2/10* (2006.01)
*H02J 7/00* (2006.01)

(52) U.S. Cl. ........ 429/100; 320/110; 320/112; 320/113; 320/116; 320/118

(58) Field of Classification Search ............ 320/112, 320/113, 116, 118, 127, 128, 133, 134, 162; 426/96; 429/100
See application file for complete search history.

(56) References Cited

U.S. PATENT DOCUMENTS

| | | | |
|---|---|---|---|
| 3,881,961 A * | 5/1975 | Nation | 429/97 |
| 4,998,888 A | 3/1991 | Link et al. | |
| 5,528,460 A * | 6/1996 | Byrd | 361/752 |
| 5,644,282 A | 7/1997 | Mehta et al. | |
| 5,977,745 A * | 11/1999 | Ryan | 320/106 |
| 6,094,357 A * | 7/2000 | Deubler et al. | 361/782 |
| 6,689,621 B2 * | 2/2004 | Merten et al. | 436/180 |
| 2006/0244315 A1 * | 11/2006 | Kogan et al. | 307/150 |

FOREIGN PATENT DOCUMENTS

| | | |
|---|---|---|
| DE | 3015751 A1 | 10/1981 |
| EP | 1411579 A1 | 4/2004 |
| GB | 2039687 A | 8/1980 |

OTHER PUBLICATIONS

"Interconnect Components & Hardware Catalog M55", Keystone Electronics Corp., 2006, 32 pages.
"Schematic of BH2DW Product", Memory Protection Services, Inc., Nov. 27, 2000, 3 pages.

\* cited by examiner

*Primary Examiner* — Edward Tso
*Assistant Examiner* — Johali A Torres Ruiz
(74) *Attorney, Agent, or Firm* — Munck Carter, LLP

(57) ABSTRACT

A battery pack includes battery terminals operable to be electrically coupled to one or more batteries. The battery pack also includes a printed circuit board electrically coupled to the battery terminals. The printed circuit board is operable to receive operating power from the one or more batteries and/or provide operating power to one or more external devices. The printed circuit board could provide power to a transmitter and/or one or more sensors in a process control system. The printed circuit board could also include a transmitter or other industrial instrument. The battery pack further includes a removable carrier attached to the printed circuit board. The removable carrier is operable to be inserted into and removed from a housing in order to insert the apparatus into the housing and remove the apparatus from the housing. The housing could, for example, represent a cylindrical casing forming part of a pipe.

20 Claims, 3 Drawing Sheets

BATTERY PACK FOR AN INDUSTRIAL INSTRUMENT IN A PROCESS CONTROL SYSTEM AND METHOD

TECHNICAL FIELD

This disclosure relates generally to battery packs and more specifically to a battery pack for an industrial instrument in a process control system and method.

BACKGROUND

Processing and production facilities are often managed using process control systems. Example processing and production facilities include manufacturing plants, chemical plants, crude oil refineries, and ore processing plants used to produce or process one or more products. Among other operations, process control systems typically manage the use of motors, valves, and other industrial equipment in the processing and production facilities.

In conventional process control systems, various controllers are often used to control the operation of the industrial equipment in the processing and production facilities. The controllers could, for example, monitor the operation of the industrial equipment, provide control signals to the industrial equipment, and generate alarms when malfunctions are detected.

Conventional process control systems may use transmitters to support communication between various components in the process control systems. For example, sensors often provide data to transmitters for communication to controllers in the process control systems. Similarly, other industrial instruments in the process control systems could be used to perform other various functions in the process control systems. These instruments require a power source to operate, and instruments in conventional process control systems use battery packs to receive operating power. Obviously, this requires the battery packs in the instruments to be replaced from time to time. However, an entire battery pack needs to be replaced when batteries in the battery pack need replacing.

SUMMARY

This disclosure provides a battery pack for an industrial instrument in a process control system and method.

In a first embodiment, an apparatus includes battery terminals operable to be electrically coupled to one or more batteries. The apparatus also includes a printed circuit board electrically coupled to the battery terminals. The printed circuit board is operable to receive operating power from the one or more batteries and/or provide operating power to one or more external devices. The apparatus further includes a removable carrier attached to the printed circuit board. The removable carrier is operable to be inserted into and removed from a housing in order to insert the apparatus into the housing and remove the apparatus from the housing.

In particular embodiments, the apparatus includes the one or more batteries. Also, the one or more batteries are replaceable without replacing the battery terminals, the printed circuit board, and the removable carrier.

In other particular embodiments, the one or more external devices include a transmitter and/or a sensor in a process control system. In yet other particular embodiments, the printed circuit board includes a transmitter.

In a second embodiment, a system includes a housing, one or more inputs operable to receive data associated with an industrial process, and an instrument operable to perform one or more functions using the data. The system also includes a battery pack, which includes battery terminals operable to be electrically coupled to one or more batteries. The battery pack also includes a printed circuit board electrically coupled to the battery terminals and operable to provide operating power to the instrument. The battery pack further includes a removable carrier attached to the printed circuit board. The removable carrier is operable to be inserted into and removed from the housing in order to insert the battery pack into the housing and remove the battery pack from the housing.

In a third embodiment, a method includes inserting a battery pack into a housing associated with industrial equipment. The industrial equipment is used to produce or process one or more products. The method also includes supplying power to an instrument using the battery pack. The instrument produces or processes data associated with operation of the industrial equipment. In addition, the method includes replacing one or more batteries in the battery pack without replacing the entire battery pack.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
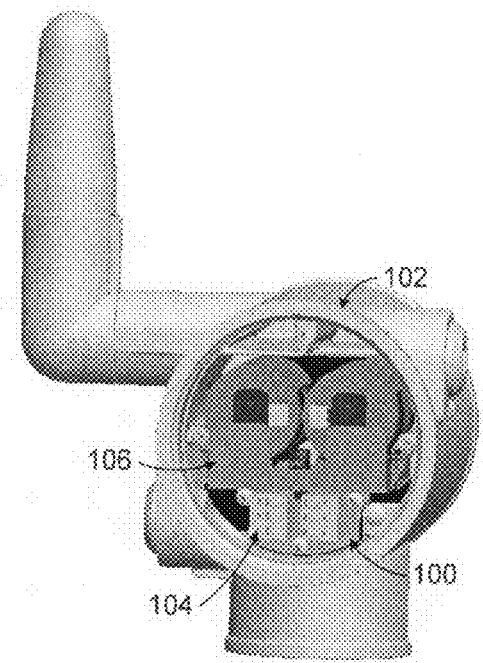
FIG. 1 illustrates an example industrial instrument in a process control system.

FIG. 1 illustrates an example industrial instrument 100 in a process control system. The embodiment of the industrial instrument 100 shown in FIG. 1 is for illustration only. Other embodiments of the industrial instrument 100 could be used without departing from the scope of this disclosure.

As shown in FIG. 1, the industrial instrument 100 is formed to fit within a larger housing 102. In this example, the housing 102 represents a cylindrical casing forming part of a pipe. The pipe could carry any suitable materials, such as water, petrochemicals, other chemicals, or any other or additional materials, used in a production or processing system. The industrial instrument 100 could be used to process data associated with the transport of materials in the pipe or other information, such as temperature, pressure, or flow rate data. The industrial instrument 100 could, for example, represent a wired or wireless transmitter capable of transmitting data to a controller. The industrial instrument 100 could be used in any other suitable housing.

The industrial instrument 100 in this example includes circuitry or other structures for producing or processing data. The circuitry could support or implement any suitable functionality in an industrial process control system. For example, the industrial instrument 100 could include circuitry for transmitting data using low-power or other radio frequency (RF) signals. In this example, the industrial instrument 100 could include any circuitry or other structures for communicating via wireless signals. Although the industrial instrument 100 may be described as representing a transmitter, the industrial instrument 100 could represent any suitable type of wired or wireless industrial instrument in a process control system. Also, although described as using RF signals, the industrial instrument 100 (such as a wireless transmitter) could use any suitable transmission frequency or spectrum to communicate any suitable distance.

In this example embodiment, the industrial instrument 100 also includes two field terminal blocks 104. The field terminal blocks 104 represent inputs that can be used to receive data to be processed by the industrial instrument 100. For example, the field terminal blocks 104 could be coupled to various sensors that provide measurement data to be communicated to a controller in a process control system. As more particular examples, the field terminal blocks 104 could receive input data from thermocouples, resistance temperature detectors (RTDs), or other sources of input data. Each of the field terminal blocks 104 represents any suitable structure for providing an interface between the industrial instrument 100 and an external source of data, such as external sensors.

The industrial instrument 100 further includes a battery pack 106. The battery pack 106 in this example includes two batteries and a removable carrier. The removable carrier allows the battery pack 106 to be inserted into and removed from the industrial instrument 100. In this way, the battery pack 106 can be removed from the industrial instrument 100 and the batteries in the battery pack 106 can be replaced as needed. This may allow only the batteries to be replaced in the industrial instrument 100, rather than requiring the entire battery pack 106 to be replaced. Additional details regarding the battery pack 106 are shown in FIGS. 2A through 3C, which are described below.

Although FIG. 1 illustrates one example of an industrial instrument 100 in a process control system, various changes may be made to FIG. 1. For example, while shown as using two batteries, the battery pack 106 could include any number of batteries.

FIGS. 2A through 2D illustrate an example battery pack 106 for an industrial instrument in a process control system. The embodiment of the battery pack 106 shown in FIGS. 2A through 2D is for illustration only. Other embodiments of the battery pack 106 could be used without departing from the scope of this disclosure. Also, for ease of explanation, the battery pack 106 shown in FIGS. 2A through 2D is described as being used in the industrial instrument 100 of FIG. 1. The battery pack 106 shown in FIGS. 2A through 2D could be used in any other suitable system or device.

Figure 2A:
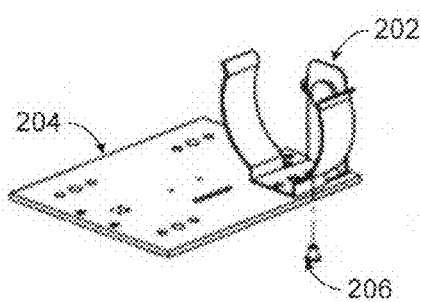
FIGS. 2A through 2D illustrate an example battery pack for an industrial instrument in a process control system.

As shown in FIG. 2A, the battery pack 106 includes a battery clip and terminal 202 attached to, mounted on, or integrated with a printed circuit board 204. The battery clip and terminal 202 provides both a clip for holding or retaining a battery in place and a terminal for forming an electrical connection with the battery. Multiple battery clips and terminals 202 can be attached to the printed circuit board 204, such as two battery clips and terminals 202 for each battery. In this example, the battery clip and terminal 202 is attached to the printed circuit board 204 using one or more screws 206, although other mechanisms could be used. Also, while shown as an integrated component, the battery clip and terminal 202 could be divided into separate elements (a battery clip and a separate battery terminal).

The printed circuit board 204 could implement any suitable logic in the industrial instrument 100. For example, the printed circuit board 204 could implement functionality for providing battery power to external components, such as to other components of the industrial instrument 100 or to external sensors coupled to the battery pack 106. The printed circuit board 204 could also implement transmitter functionality or other functionality of the industrial instrument 100, such as circuitry for receiving data, generating a signal containing the data, and providing the signal to an antenna for wireless transmission. In particular embodiments, the printed circuit board 204 could include filters, amplifiers, gain controllers, and other transmission elements.

Figure 2B:
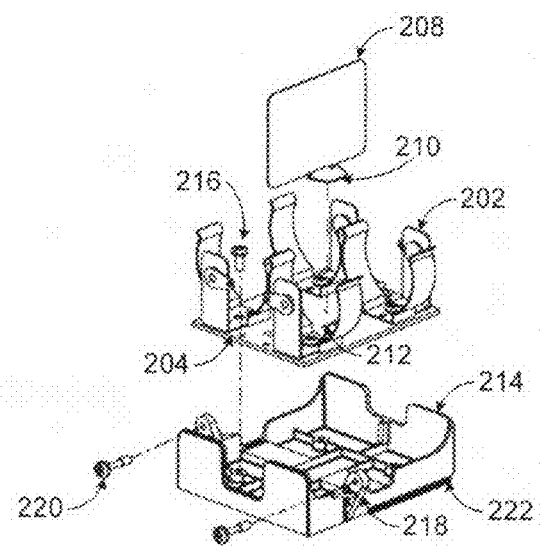

As shown in FIG. 2B, a battery insulator 208 can be inserted between two sets of battery clips and terminals 202. The battery insulator 208 could, for example, include a tab 210 that can be inserted into a corresponding slot 212 of the printed circuit board 204. Once inserted into the slot 212, the tab 210 could be bent or folded to hold the battery insulator 208 in place. The battery insulator 208 may conform to the shape of a battery inserted into the battery pack 106 next to the battery insulator 208. The battery insulator 208 may help to prevent multiple batteries from shorting against each other when inserted into the battery pack 106. The battery insulator 208 could be formed of any suitable electrically insulating material(s), such as a flexible polymer.

The structure formed from the battery clips and terminals 202, the printed circuit board 204, and the battery insulator 208 can be attached to a removable carrier 214. The removable carrier 214 represents a structure that supports the other components of the battery pack 106 and allows the battery pack 106 to be inserted into and removed from its operating environment (such as within the industrial instrument 100). In this example, the printed circuit board 204 is attached to the removable carrier 214 using one or more screws 216, although other mechanisms could be used.

In this example, the removable carrier 214 includes various features supporting retention and alignment of the battery pack 106. For example, the removable carrier 214 includes two support arms 218, which are used to retain the battery pack 106 in place. When the removable carrier 214 is inserted into position in the industrial instrument 100 or other device or system, two screws 220 or other attachment mechanisms can be inserted through the support arms 218 to lock the battery pack 106 in place. As shown in FIG. 1, the screws 220 could be used to attach the removable carrier 214 to the housing 102, thereby fixing the battery pack 106 in the housing 102. This helps to ensure that the battery pack 106 is retained in its desired position. Moreover, the removable carrier 214 includes a guide projection 222 on one or more sides of the removable carrier 214. The guide projections 222 could fit within corresponding slots or grooves in the industrial instrument 100 or other device or system. This helps to ensure that the battery pack 106 is aligned properly when inserted into the industrial instrument 100 or other device or system.

Figure 2C:
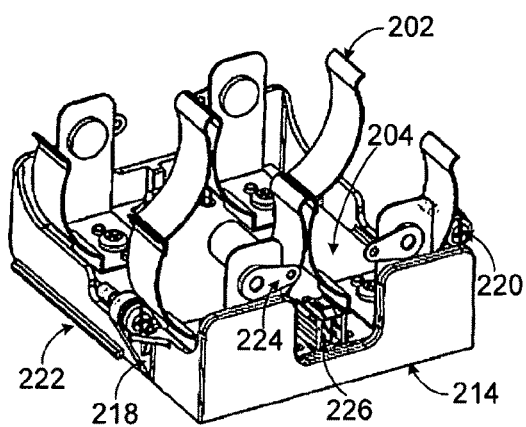

FIG. 2C illustrates the battery pack 106 constructed thus far (although the battery insulator 208 is omitted for ease of illustration). As shown here, each of the battery clips and terminals 202 includes a lead 224. Each lead 224 can be coupled to a battery clip and terminal 202 in any suitable manner, such as by soldering. Each lead 224 could also be coupled to any suitable circuit, such as by coupling the lead 224 to the printed circuit board 204 via a wire or other connector. The removable carrier 214 here also includes a connector module 226, which can be used to supply power via a cable to other components in or near the battery pack 106. For example, the connector module 226 could be used to supply power to components of the industrial instrument 100 or to various sensors, such as to multiple sensors' printed wiring assemblies.

Figure 2D:
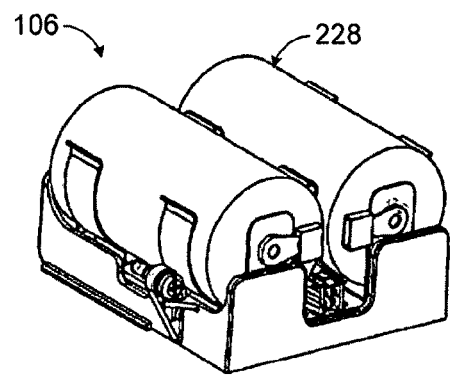

As shown in FIG. 2D, two batteries 228 can be inserted into the battery clips and terminals 202 to form a complete battery pack 106. The battery pack 106 can be inserted into an industrial instrument 100 or other system or device. The battery pack 106 can also be removed from the industrial instrument 100 or other system or device so that the batteries 228 can be replaced. In this way, the batter pack 106 provides a convenient and more cost effective mechanism for providing power to the industrial instrument 100 and surrounding sensors since only the batteries 228, not the entire battery pack 106, may need to be replaced.

Although FIGS. 2A through 2D illustrate one example of a battery pack 106 for an industrial instrument 100 in a process control system, various changes could be made to FIGS. 2A through 2D. For example, any suitable coupling, mounting, or attachment mechanisms could be used in place of the screws. Also, the battery clips could be wider or narrower, and any suitable number of clips could be used (including one per battery). In addition, any other or additional alignment and retention mechanisms could be used by the battery pack 106.

Figure 3A:
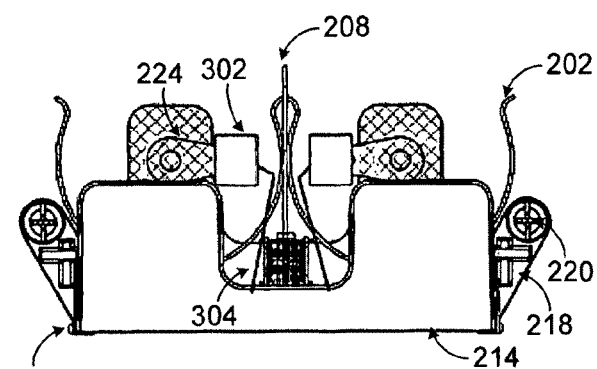
FIGS. 3A through 3C illustrate additional details of an example battery pack for an industrial instrument in a process control system.
Figure 3B:
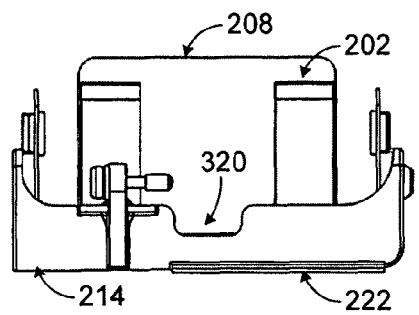
Figure 3C:
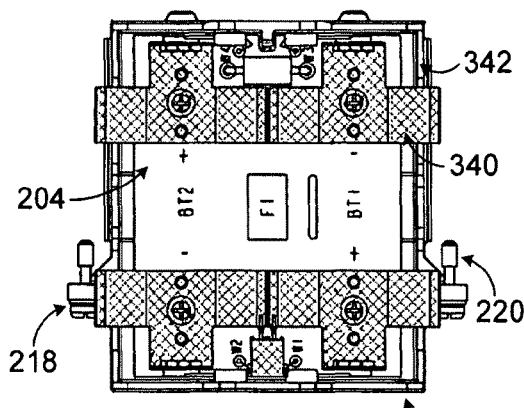

FIGS. 3A through 3C illustrate additional details of an example battery pack 106 for an industrial instrument 100 in a process control system. The additional details of the battery pack 106 shown in FIGS. 3A through 3C are examples only of specific implementations of the battery pack 106.

As shown in FIG. 3A, the battery pack 106 includes the leads 224, which are electrically coupled to the batteries 228 via the battery clips and terminals 202. In this example, each of the leads 224 is attached to a connector 302, which is attached to a wire 304. The connector 302 provides electrical connection from a battery (via a lead 224) to the wire 304. The wire 304 couples the connector 302 to the printed circuit board 204, thereby providing an electrical connection from the battery to the printed circuit board 204. In this example, the connectors 302 are formed to fit around the ends of the leads 224. However, any other suitable type of connector could be used to electrically couple a battery to the printed circuit board 204.

As shown in FIG. 3B, the battery insulator 208 may have a width that is approximately as wide as the distance between the outer ends of the battery clips. Also, the battery insulator 208 may have a height that is greater than the height of the battery clips. However, once a battery 228 is inserted into the battery pack 106, the battery insulator 208 may conform to the shape of the battery 228, and the battery 228 may deflect the battery insulator 208 so that the battery insulator 208 has a shorter height. Also, the removable carrier 214 can include a notch 320, which could help to facilitate easier extraction of one or more batteries 228 from the battery pack 106. The notch 320 could, for example, allow an object to be inserted through the notch 320 under a battery 228 so that an upward force can be applied to the battery 228, causing the battery 228 to separate from the battery clips. In addition, the guide projections 222 of the removable carrier 214 can be located more rearward on the removable carrier 214, and the guide projections 222 could have a length that is greater than one-half the length of the removable carrier 214.

As shown in FIG. 3C, the removable carrier 214 includes bottom portions 340 attached to sides 342 of the removable carrier 214. The portions 340 form the bottom surface of the removable carrier 214 and allow part of the printed circuit board 204 to remain exposed after the printed circuit board 204 is attached to, mounted on, or placed in the removable carrier 214. The printed circuit board 204 in this example is attached to the portions 340 of the removable carrier 214 (using screws 216). Also, in this example, one of the portions 340 is located beneath the support arms 218, and the other portion 340 is located towards the rear of the battery pack 106.

Although FIGS. 3A through 3C illustrate additional details of one example battery pack 106 for an industrial instrument 100 in a process control system, various changes could be made to FIGS. 3A through 3C. For example, the battery pack 106 could have any other or additional features. As particular examples, any suitable electrical connections could be made between the batteries 228 and the printed circuit board 204. Also, the battery insulator 208 and the removable carrier 214 could each have any suitable size, shape, and arrangement.

Figure 4:
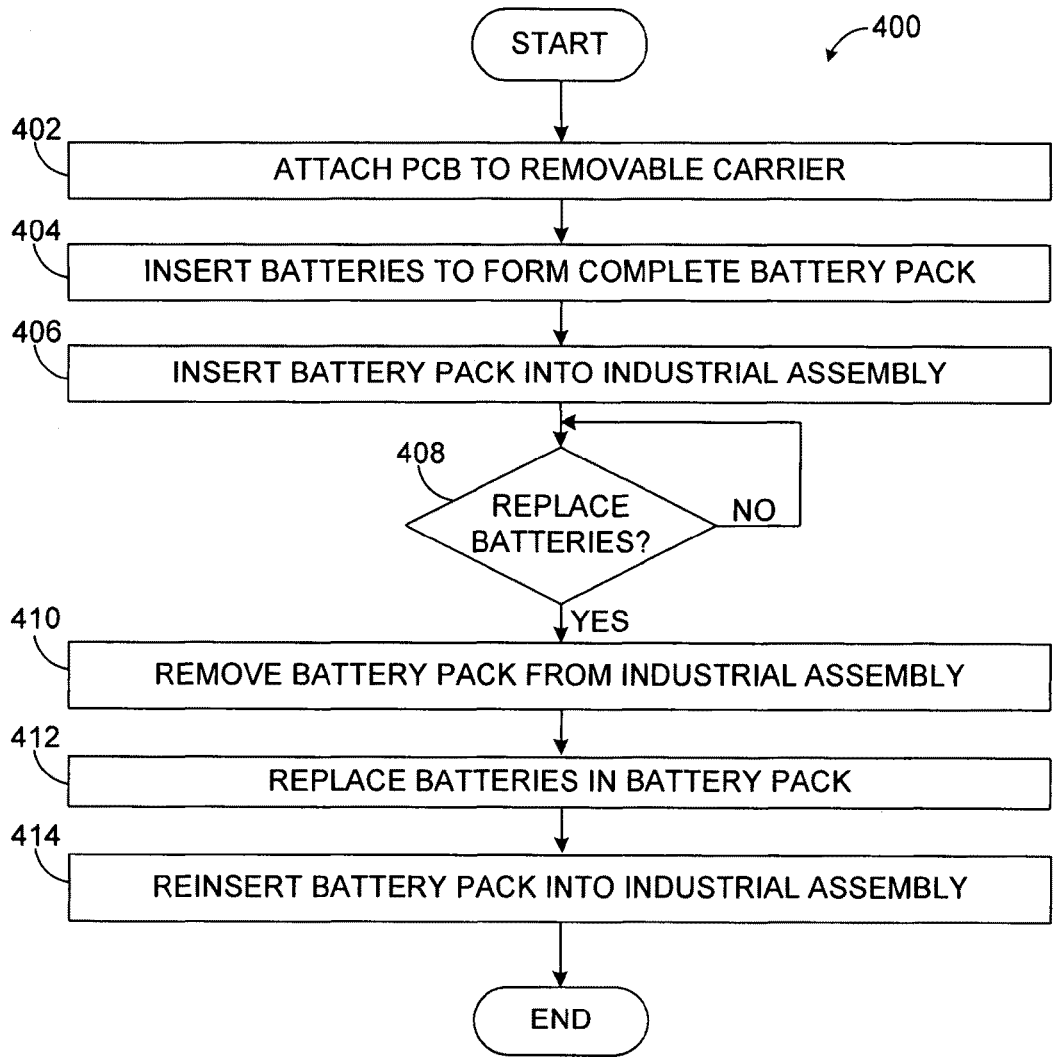
FIG. 4 illustrates an example method for providing battery power to an industrial instrument in a process control system.

FIG. 4 illustrates an example method 400 for providing battery power to an industrial instrument 100 in a process control system. For ease of explanation, the method 400 is described with reference to the battery pack 106 being used in the industrial instrument 100 of FIG. 1. The method 400 could be used with any other suitable battery pack, device, or system.

A printed circuit board is attached to a removable carrier at step 402. This may include, for example, attaching the printed circuit board 204 to the removable carrier 214 using screws 216. The printed circuit board 204 may be coupled to or include a number of battery clips and terminals 202.

One or more batteries are inserted to form a complete battery pack at step 404. This may include, for example, inserting one or multiple batteries 228 into the battery clips and terminals 202. The batteries 228 may be electrically connected to the printed circuit board 204 via the leads 224 on the battery clips and terminals 202.

The entire battery pack is inserted into an industrial assembly at step 406. This may include, for example, inserting the battery pack 106 inside a housing 102 associated with a pipe in a production or processing facility. The battery pack 106 could be aligned appropriately using the guide projections 222 and retained in place using the support arms 218 and the screws 220. At this point, any additional connections can be made, such as attaching a power cable to the connector module 226.

The battery pack can provide operating power for the industrial instrument 100 or other device or system until one or more of the batteries need to be replaced at step 408. When this occurs, the battery pack is removed from the industrial assembly at step 410, the battery or batteries are replaced at step 412, and the battery pack is reinserted into the industrial assembly at step 414. This may include replacing only the batteries 228 in the battery pack 106, rather than replacing the entire battery pack 106.

Although FIG. 4 illustrates one example of a method 400 for providing battery power to an industrial instrument 100 in a process control system, various changes may be made to FIG. 4. For example, the batteries 228 could be inserted into and removed from the battery pack 106 while the battery pack 106 is installed in the industrial assembly (eliminating the need to remove the battery pack 106 in order to replace the batteries 228). Also, the battery pack 106 could provide power to additional components.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
    battery terminals operable to be electrically coupled to multiple batteries;
    battery clips operable to retain the batteries;
    a printed circuit board fastened to the battery terminals and the battery clips, the printed circuit board operable to receive power from the batteries;
    a removable carrier having a bottom and operable to be inserted into and removed from a housing in order to insert the apparatus into the housing and remove the apparatus from the housing; and
    a flexible insulator having a height that is greater than a height of the battery clips, the insulator comprising a tab configured to be inserted into a slot of the printed circuit board, the insulator operable to separate two adjacent batteries from one another, electrically isolate the two adjacent batteries from one another, and, upon insertion of at least one of the batteries, at least partially conform to a shape of the at least one battery such that the insulator has a shorter height;
    wherein the removable carrier comprises (i) at least one guide operable to align the removable carrier when inserted into the housing and (ii) at least one support arm operable to be attached to the housing to retain the removable carrier in place within the housing;
    wherein the bottom of the removable carrier comprises a plurality of bottom portions and an opening, the opening configured to provide access to a back side of the printed circuit board.

2. The apparatus of claim 1, further comprising the batteries;
    wherein the batteries are replaceable without replacing the battery terminals, the printed circuit board, and the removable carrier.

3. The apparatus of claim 1, further comprising a connector module coupled to the printed circuit board and operable to receive a power cable, the connector module operable to provide power to one or more external devices through the power cable.

4. The apparatus of claim 1, wherein the slot in the printed circuit board is closer to some of the battery terminals than to others of the battery terminals.

5. The apparatus of claim 1, wherein the removable carrier comprises:
    multiple guides that are positioned on opposing sides of the removable carrier, the guides configured to fit within slots or grooves in the housing when the removable carrier is inserted into the housing; and
    multiple support arms on the opposing sides of the removable carrier, the support arms operable to be attached to the housing to retain the removable carrier in place within the housing.

6. The apparatus of claim 1, wherein each of four battery terminals is integrated with one of four battery clips.

7. The apparatus of claim 3, wherein the one or more external devices comprise at least one of: a transmitter and a sensor in a process control system.

8. The apparatus of claim 1, wherein the printed circuit board comprises a transmitter.

9. The apparatus of claim 1, wherein the printed circuit board is attached to the removable carrier between the battery clips and the bottom of the removable carrier such that the batteries are removed in order to remove the printed circuit board from the removable carrier.

10. The apparatus of claim 1, wherein the flexible insulator is substantially flat prior to the insertion of the at least one battery and the conformance of the insulator to the shape of the at least one battery.

11. A system comprising:
    a housing;
    one or more inputs operable to receive data associated with an industrial process;
    an instrument operable to perform one or more functions using the data; and
    a battery pack comprising:
        battery terminals operable to be electrically coupled to multiple batteries;
        battery clips operable to retain the batteries;
        a printed circuit board fastened to the battery terminals and the battery clips, the printed circuit board operable to provide power to the instrument; and
        a removable carrier having a bottom and operable to be inserted into and removed from the housing in order to insert the battery pack into the housing and remove the battery pack from the housing; and
    a flexible insulator having a height that is greater than a height of the battery clips, the insulator comprising a tab configured to be inserted into a slot of the printed circuit board, the insulator operable to separate two adjacent batteries from one another, electrically isolate the two adjacent batteries from one another, and, upon insertion of at least one of the batteries, at least partially conform to a shape of the at least one battery such that the insulator has a shorter height;
    wherein the removable carrier comprises (i) at least one guide operable to align the removable carrier when inserted into the housing and (ii) at least one support arm operable to be attached to the housing to retain the removable carrier in place within the housing;
    wherein the bottom of the removable carrier comprises a plurality of bottom portions and an opening, the opening configured to provide access to a back side of the printed circuit board.

12. The system of claim 11, wherein:
    the battery pack further comprises the batteries; and
    the batteries are replaceable without replacing the battery terminals, the printed circuit board, and the removable carrier.

13. The system of claim 11, wherein the battery pack further comprises a connector module coupled to the printed circuit board and operable to receive a power cable, the connector module operable to provide power to one or more external devices through the power cable.

14. The system of claim 13, wherein the one or more external devices comprise one or more sensors operable to provide the data.

15. The system of claim 11, wherein the slot in the printed circuit board is closer to some of the battery terminals than to others of the battery terminals.

16. The system of claim 11, wherein the removable carrier comprises:
multiple guides that are positioned on opposing sides of the removable carrier, the guides configured to fit within slots or grooves in the housing when the removable carrier is inserted into the housing; and
multiple support arms on the opposing sides of the removable carrier, the support arms operable to be attached to the housing to retain the removable carrier in place within the housing.

17. The system of claim 11, wherein each of four battery terminals is integrated with one of four battery clips.

18. The system of claim 11, wherein the printed circuit board comprises the instrument.

19. The system of claim 11, wherein:
the housing comprises a cylindrical casing forming part of a pipe;
the data is associated with one or more materials in the pipe; and
the instrument comprises a transmitter.

20. A method comprising:
inserting a battery pack into a housing associated with industrial equipment, the industrial equipment associated with production or processing of one or more materials;
supplying power to an instrument using the battery pack, the instrument producing or processing data associated with operation of the industrial equipment; and
replacing at least one of multiple batteries in the battery pack without replacing the entire battery pack by:
removing the battery pack from the housing, the battery pack comprising (i) battery terminals operable to be electrically coupled to the batteries, (ii) battery clips operable to retain the batteries, (iii) a printed circuit board fastened to the battery terminals and the battery clips and operable to provide power to the instrument, and (iv) a removable carrier having a bottom that comprises a plurality of bottom portions and an opening, the opening providing access to a back side of the printed circuit board;
replacing the at least one battery in the battery pack; and
reinserting the battery pack into the housing by using at least one guide on the removable carrier to align the removable carrier and by attaching at least one support arm on the removable carrier to the housing to retain the removable carrier in place within the housing;
wherein the battery pack further comprises a flexible insulator having a height that is greater than a height of the battery clips, the insulator comprising a tab configured to be inserted into a slot of the printed circuit board, the insulator operable to separate two adjacent batteries from one another, electrically isolate the two adjacent batteries from one another, and, upon insertion of at least one of the batteries at least partially conform to a shape of the at least one batter such that the insulator has a shorter height.

* * * * *